United States Patent [19]
Bloom et al.

[11] 3,917,430
[45] Nov. 4, 1975

[54] FLUID PRESSURE OPERATED ACTUATOR ARRANGEMENT

[75] Inventors: Joseph Louis Bloom, Droitwich; Trevor Stanley Smith, Sutton Coldfield, both of England

[73] Assignee: Lucas Aerospace Limited, Birmingham, England

[22] Filed: July 3, 1974

[21] Appl. No.: 485,330

[30] Foreign Application Priority Data
July 5, 1973 United Kingdom.............. 32090/73

[52] U.S. Cl. .................. 415/26; 415/27; 60/39.25; 60/39.28 R; 60/39.29
[51] Int. Cl.² ........................ F02C 9/14; F02C 7/02
[58] Field of Search............. 60/39.28, 39.25, 39.29; 73/407 PR; 415/26, 27

[56] References Cited
UNITED STATES PATENTS

| | | | |
|---|---|---|---|
| 2,764,868 | 10/1956 | Watson .......................... | 60/39.28 R |
| 3,394,721 | 7/1968 | Ifield ............................. | 60/39.28 R |

*Primary Examiner*—Clarence R. Gordon
*Attorney, Agent, or Firm*—Olson, Trexler, Wolters, Bushnell & Fosse, Ltd.

[57] ABSTRACT

An actuator arrangement has a valve which controls a servo pressure for a piston. The valve is operated by a lever arrangement, the ratio of which is variable by a transmission roller forming part of the lever arrangement and movable by the piston. An input to the lever arrangement is provided by an element sensitive to a first pressure. The valve is biased by a second pressure against movement in response to an increase in said first pressure.

16 Claims, 4 Drawing Figures

FLUID PRESSURE OPERATED ACTUATOR ARRANGEMENT

This invention relates to fluid pressure operated actuator arrangements which are responsive to the ratio of two input pressure signals.

According to the invention a fluid pressure operated actuator arrangement comprises a body, an actuator element movable with respect to said body in response to a servo pressure signal, first and second levers pivotally mounted in said body, transmission means engaged between said levers, means responsive to a first input pressure signal to urge said first lever into engagement with said transmission means, means urging said second lever into engagement with said transmission means, a valve responsive to the position of one of said levers to provide said servo pressure signal, and means responsive to movement of said actuator element to vary the position of said transmission means with respect to the pivotal axis of one of said levers.

Figure 1:
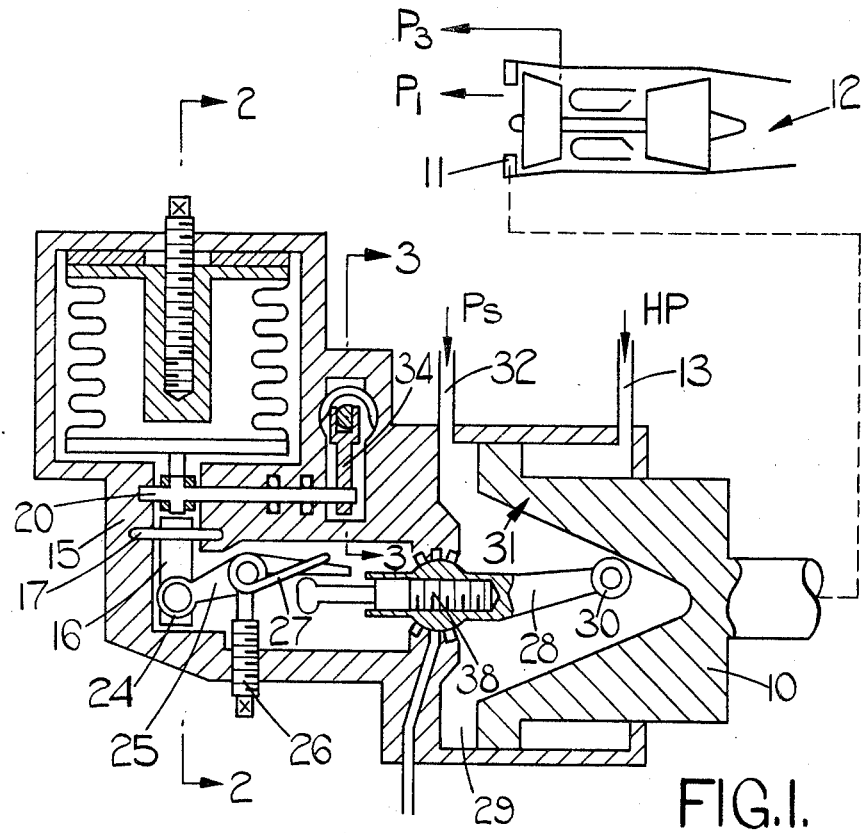
Figure 2:
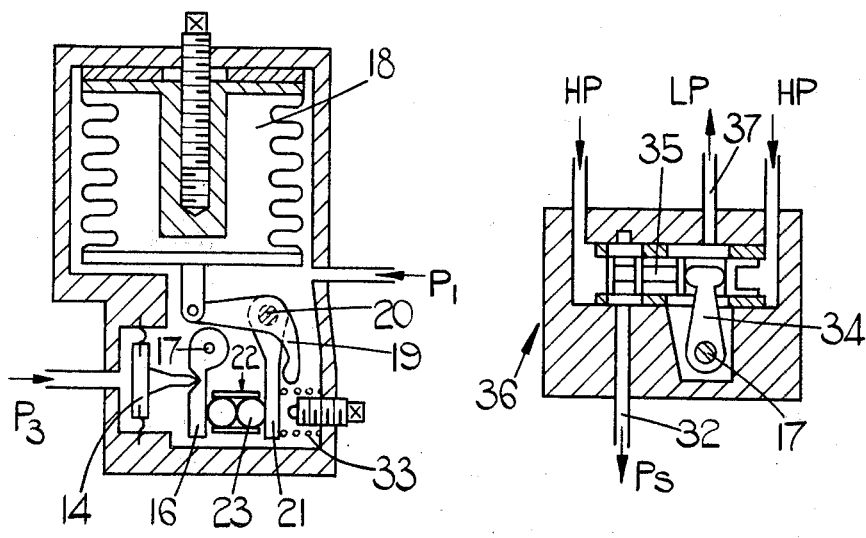
Figure 3:
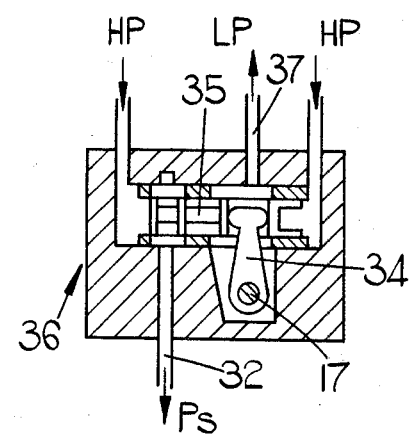
Figure 4:
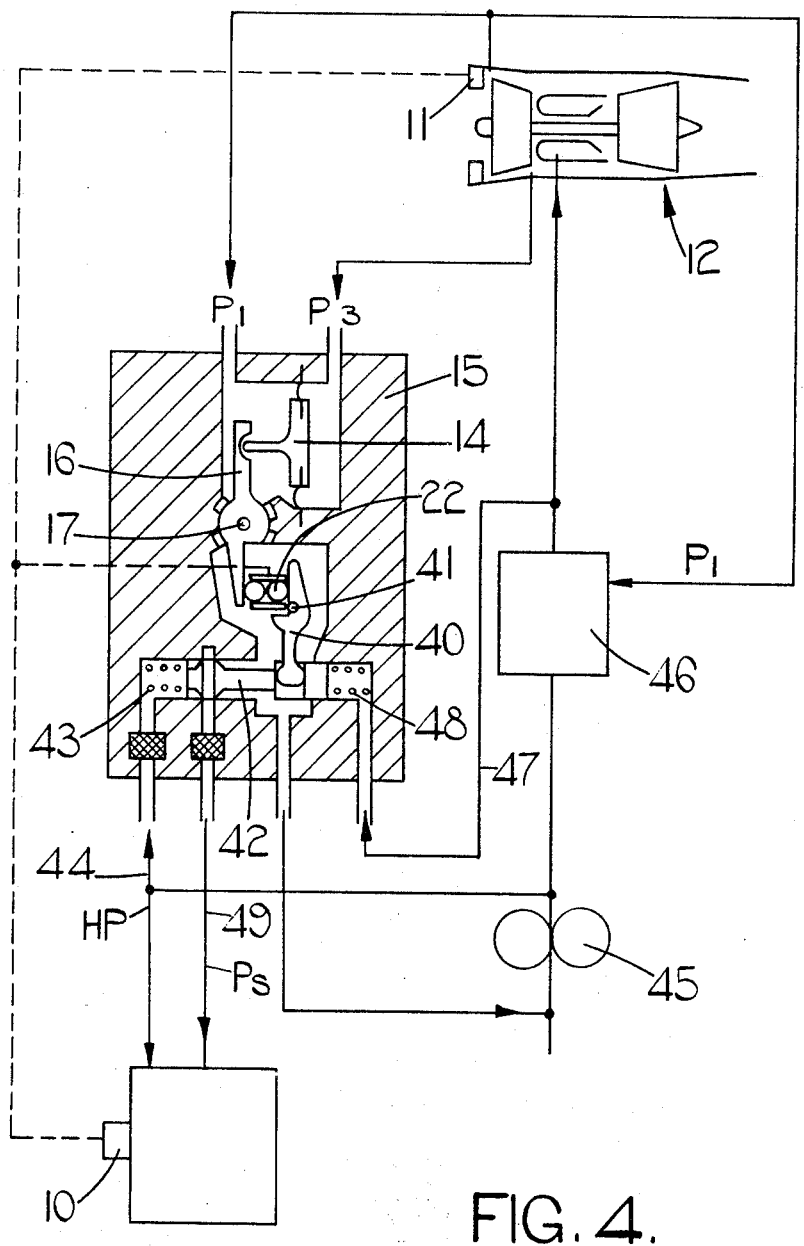

An embodiment of the invention will now be described by way of example and with reference to the accompanying drawings, in which:

FIG. 1 shows, diagrammatically, an actuator arrangement for the inlet guide vanes of a gas turbine engine, FIGS. 2 and 3 show, sections generally on the corresponding lines in FIG. 1, and FIG. 4 shows an alternative embodiment of the arrangement.

The actuator arrangement shown has a piston actuator element 10 coupled by a suitable linkage to the inlet guide vanes 11 of a gas turbine engine 12. Piston 10 is biased in a direction to open the vanes 11 by a hydraulic pressure HP applied via a passage 13.

A diaphragm assembly 14 is movable within a body 15 in response to a first input pressure, provided by the delivery pressure $P_3$ of the engine compressor and to a second input pressure $P_1$ at the engine compressor inlet. Diaphragm assembly 14 engages a first lever 16 mounted in the body 15 for movement about a pivot pin 17. An evacuated resilient bellows unit 18 within the body 15 is subjected externally to the pressure $P_1$. A cranked lever 19 is connected to one end of bellows unit 18 for movement thereby about a pivot pin 20, which is parallel to pin 17. One end of lever 19 abuts a lever 21 which is secured to pin 20 for movement therewith. The arrangement is such that increases in pressures $P_3$ and $P_1$ urge levers 16, 21 respectively towards one another. Lever 21 is also biased towards lever 16 by a spring 33. Engaged between levers 21, 16 is a transmission device 22, in the form of a pair of balls 23 in a cage 24. The distance between the pivot pin 17 and the point of engagement of transmission device 22 with lever 16 is always less than the corresponding distance between pivot pin 20 and the point of engagement of device 22 with lever 21, the pivot pins 17, 20 being, as shown, on the same side of the zone of engagement of device 22 with levers 16, 21. Cage 24 is carried on one end of a lever 25 the position of whose fulcrum is adjustable by a screw 26. The end of lever 25 remote from cage 24 is biased by a torsion spring 27 into abutment with the end of a lever 28 which extends sealingly through an internal dividing wall of body 15 into a cylinder 29 within which piston 10 is slidable. The end of lever 28 remote from lever 25 carries a roller 30 which engages the wall of a conical recess 31 in piston 10. Roller 30 is effectively biased into contact with the wall of recess 31 by spring 27, and the arrangement is such that movement of piston 10 to shut vanes 11, in response to an increase in a servo pressure $P_S$ applied via a passage 32, acts to urge the balls 23 of transmission device 22 in the direction of pivot pins 17, 20.

Secured to pivot pin 20 for movement by lever 21 is an arm 34 which can move a valve spool 35 in a valve arrangement 36. Both ends of spool 35 are acted on by the hydraulic pressure HP, and spool 35 is movable to connect the passage 32 either to the line 13 carrying the high pressure HP or to a low pressure LP in a return line 37. The arrangement is such that movement of arm 34 in response to an increase in pressure $P_3$ or a decrease in pressure $P_1$ causes the servo pressure signal $P_S$ in passage 32 to fall to low pressure, opening the inlet guide vanes 11. The resultant clockwise movement of lever 28, as seen in FIG. 1, moves transmission device 22 closer to the pivotal axes of levers 21, 16. The effect of pressure $P_1$ on levers 21, 16 becomes correspondingly greater, and the apparatus returns the valve spool 35 to the equilibrium position shown in FIG. 3, piston 10 and vanes 11 remaining in their new positions.

A reduction in pressure $P_3$ or an increase in pressure $P_1$ similarly causes vanes 11 to be closed.

The length of the arm of lever 28 remote from roller 30 is adjustable by means of a screw thread 38 to vary the rate of response of the system. An adjustable stop 39 is provided to limit movement of lever 21 in response to a decrease in pressure $P_1$.

The alternative actuator arrangement shown in FIG. 4 is generally similar to that previously described, similar parts having identical reference numbers. A first lever 16 is mounted in a body 15 for movement by a diaphragm assembly 14 which is responsive to first and second input pressures $P_3$, $P_1$.

A second lever 40 is mounted in the body 15 for movement about a pivot pin 41 whose axis is parallel to that of a pivot pin 17 for lever 16. A transmission device 22 engaged between levers 16, 40 and is mounted in body 15 for movement towards and away from pivot pins 17, 41. Pivot pins 17, 41 are on opposite sides of the zone of engagement of device 22 with levers 16, 40, so that movement of device 22 alters the ratio of movement between diaphragm assembly 14 and the end of lever 40 remote from device 22.

Device 22 is movable, as before, in response to movement of a piston 10 in a direction to shut the inlet guide vanes 11 of engine 12, towards pivot pin 17, and thus to reduce the effect of pressure $P_3$ on lever 40.

Lever 40 engages a valve spool 42 which is biased by a spring 43 in a direction to urge lever 40 into engagement with device 22. Spool 42 is urged in the same direction by the pressure in a line 44 from the outlet of a pump 45 which supplies fuel to the engine 12. A variable metering device 46 is responsive, inter alia, to pressure $P_1$ to control fuel flow from pump 45 to engine 10. Spool 42 is urged against spring 43 and the pressure in line 44 by the pressure in a line 47 from the downstream side of metering device 46, and by a spring 48. Spool 42 is thus responsive to the pressure drop across metering device 46, this pressure drop being a function of pressure $P_1$, and an increase in the pressure drop resulting in an increase in servo pressure $P_S$ in a line 49. Spool 42 is positioned, as before, in accordance with pressures $P_1$, $P_3$ and with the position of piston 10.

Spool 42 controls the magnitude of the servo pressure $P_S$, pressure $P_S$ being used, as before to urge piston 10 against the bias applied by the high pressure HP in line 44.

We claim:

1. A fluid pressure operated actuator arrangement, comprising a body, an actuator element movable with respect to said body in response to a servo pressure signal, first and second levers pivotally mounted in said body, transmission means engaged between said levers, means, responsive to a first input pressure signal, for urging said first lever into engagement with said transmission means, means for urging said second lever into engagement with said transmission means, a valve responsive to the position of one of said levers to provide said servo pressure signal, and a third lever mounted in said body and engageable with said transmission means, said third lever being movable by said actuator element to vary the position of said transmission means with respect to the pivotal axis of one of said first and second levers.

2. An actuator arrangement as claimed in claim 1 in which the pivotal axes of said levers are substantially parallel.

3. An actuator arrangement as claimed in claim 2 in which said pivotal axes lie on the same side of the zone of engagement of said transmission means with said levers, and in which the distance between said zone and one of said axes is always greater than the distance between said zone and the other of said axes.

4. An actuator arrangement as claimed in claim 2 in which said pivotal axes lie on opposite sides of the zone of engagement of said transmission means with said levers.

5. An actuator arrangement as claimed in claim 1 in which said means responsive to the first pressure signal comprises a diaphragm assembly.

6. An actuator arrangement as claimed in claim 1 in which said transmission means includes a rolling element engaged between said levers and a carrier for said element, said carrier being pivotally mounted in said body and said element being supported at one end of said carrier, the other end of said carrier being movable by said third lever.

7. An actuator arrangement as claimed in claim 6, in which said actuator element comprises a piston and in which third lever engages said carrier.

8. An actuator arrangement as claimed in claim 7 in which said piston is provided with a surface which is inclined to the line of action of said piston, and which includes means biasing said third lever and said carrier into interengagement and also biasing said third lever into engagement with said inclined surface.

9. An actuator arrangement as claimed in claim 7 which includes means for varying the length of said third lever between the pivot point thereof and said other end thereof.

10. An actuator arrangement as claimed in claim 7 which includes means for moving the pivot point of said carrier in said body.

11. An actuator arrangement as claimed in claim 7 in which said valve is responsive to the position of said second lever.

12. An actuator arrangement as claimed in claim 7 in which said valve includes a spool control element.

13. An actuator arrangement as claimed in claim 12 in which said means urging said second lever into engagement with said transmission means comprises a spring acting on said spool control element.

14. An actuator arrangement as claimed in claim 13 which includes a linkage coupling said actuator element to control vanes on a gas turbine engine, and a fuel metering device responsive to said second input pressure signal for controlling fuel flow to the engine, said spool control element being responsive to the pressure drop across said metering device, an increase in said pressure drop resulting in an increase in said servo pressure signal.

15. An actuator arrangement as claimed in claim 1 which includes means responsive to a second input pressure signal to urge said second lever into engagement with said transmission means, an increase in said second input pressure signal or a decrease in said first input pressure signal resulting in an increase in said servo pressure signal.

16. An actuator arrangement as claimed in claim 15 which includes a linkage coupling said actuator element to control vanes on a gas turbine engine, said first and second input pressure signals being respectively derived from the pressures at the outlet and inlet of a compressor of said engine.

* * * * *